US010119652B2

(12) United States Patent
Cote

(10) Patent No.: US 10,119,652 B2
(45) Date of Patent: Nov. 6, 2018

(54) POLE AND HUB

(71) Applicant: Pual L. Cote, Lac Brome (CA)

(72) Inventor: Pual L. Cote, Lac Brome (CA)

( * ) Notice: Subject to any disclaimer, the term of this patent is extended or adjusted under 35 U.S.C. 154(b) by 0 days.

(21) Appl. No.: 15/330,905

(22) Filed: Nov. 14, 2016

(65) Prior Publication Data
US 2017/0138529 A1     May 18, 2017

(30) Foreign Application Priority Data

Nov. 13, 2015   (CA) .................................... 2911981

(51) Int. Cl.
| | |
|---|---|
| *F16M 11/08* | (2006.01) |
| *F16M 11/16* | (2006.01) |
| *A45F 3/44* | (2006.01) |
| *E04H 12/08* | (2006.01) |
| *E04H 12/22* | (2006.01) |
| *A01G 9/12* | (2006.01) |
| *A01K 39/012* | (2006.01) |
| *A01K 39/014* | (2006.01) |
| *F16M 11/04* | (2006.01) |
| *F16M 11/24* | (2006.01) |
| *E04H 12/24* | (2006.01) |
| *E04H 12/34* | (2006.01) |
| *A01K 39/01* | (2006.01) |
| *A47G 7/04* | (2006.01) |
| *F16M 11/22* | (2006.01) |
| *E02D 5/80* | (2006.01) |

(52) U.S. Cl.
CPC .............. *F16M 11/16* (2013.01); *A01G 9/12* (2013.01); *A01K 39/01* (2013.01); *A01K 39/012* (2013.01); *A01K 39/014* (2013.01); *A45F 3/44* (2013.01); *A47G 7/041* (2013.01); *E02D 5/801* (2013.01); *E04H 12/08* (2013.01); *E04H 12/2223* (2013.01); *E04H 12/2238* (2013.01); *E04H 12/24* (2013.01); *E04H 12/347* (2013.01); *F16M 11/041* (2013.01); *F16M 11/046* (2013.01); *F16M 11/22* (2013.01); *F16M 11/24* (2013.01); *F16M 11/08* (2013.01); *F16M 2200/028* (2013.01); *F16M 2200/066* (2013.01); *F16M 2200/08* (2013.01)

(58) Field of Classification Search
USPC ........ 248/127, 158, 161; 403/335, 336, 337, 403/345, 378, 379.3
See application file for complete search history.

(56) References Cited

U.S. PATENT DOCUMENTS 3,345,711 A * 10/1967 McCarthy ................. F16B 7/22
                                                            24/573.11
4,248,916 A *  2/1981 Chase .................... A47G 33/06
                                                            211/205
(Continued)

*Primary Examiner* — Alfred J Wujciak
(74) *Attorney, Agent, or Firm* — Eric Fincham

(57) ABSTRACT

There is provided a pole system suitable for supporting other objects such as bird feeders, plants and the like, the pole system having a pole with at least one transversely extending aperture formed therein, a pin mounted in the aperture and extending exteriorly of the pole on opposite sides thereof, and a hub member having a bottom surface, the bottom surface including a scalloped wall which is arranged to receive the pin such that the hub member is supported, the scalloped wall permitting rotation of the hub when sufficient rotational force is applied thereto.

5 Claims, 8 Drawing Sheets

(56) References Cited

U.S. PATENT DOCUMENTS

| | | | | |
|---|---|---|---|---|
| 4,836,480 A | * | 6/1989 | Besner | A47J 37/0763 |
| | | | | 126/25 A |
| 6,138,973 A | * | 10/2000 | Woodward | B63B 29/06 |
| | | | | 248/188.5 |
| RE39,917 E | * | 11/2007 | Domenig | 211/129.1 |
| 9,039,090 B2 | * | 5/2015 | Pritchard | A47C 7/506 |
| | | | | 248/161 |
| 2005/0236532 A1 | * | 10/2005 | Bain | A47G 25/0664 |
| | | | | 248/158 |
| 2007/0051858 A1 | * | 3/2007 | Bailey | A47C 3/0255 |
| | | | | 248/127 |
| 2011/0073553 A1 | * | 3/2011 | Buege | A47F 5/04 |
| | | | | 211/59.4 |

\* cited by examiner

POLE AND HUB

FIELD OF THE INVENTION

The present invention relates to pole systems, and more particularly, relates to improvements in pole systems.

BACKGROUND OF THE INVENTION

Pole systems have been known in the art for many years. Pole systems basically comprise a pole which may be implanted in the ground or other medium, or alternatively, which may be secured to an adjacent structure. The pole is then used to support one or more members or structures thereon. Such structures can include, for example, horticultural containers, bird feeders, etc.

A pole system which is implanted in the ground is essentially a relatively fragile structure. The poles are easily dislocated from the medium in which they are implanted and generally cannot support a very large weight, particularly unbalanced weight. Such unbalanced weight will tend to exert a force on the pole which will cause the same to lean or fall.

SUMMARY OF THE INVENTION

It is an object of the present invention to provide a pole system which has sufficient rigidity and strength to be implanted in the ground and which can serve a multitude of uses.

According to one aspect of the present invention, there is provided a pole system comprising a pole having at least one transversely extending aperture formed therein, the aperture extending through the pole, a pin mounted in the aperture, the pin extending exteriorly of the pole on opposite sides thereof, and a hub member, the hub member having a bottom surface, the bottom surface including a scalloped wall, the scalloped wall sitting on the pin such that the hub member is supported.

The hub member, as stated above, has a wall with a scalloped surface. The wall having the scalloped surface functions as a support for the hub in that the pin mounted within the aperture in the pole rests on the hub member and more particularly, rests on the scalloped wall. As there are a plurality of scallops formed in the wall, a rotational force applied to the hub will be resisted to the extent that the force will cause the hub to rotate and cause the pin to move into an adjacent scallop.

Each scallop is defined as an arcuate recess formed in the bottom wall of the hub member. Each arcuate recess is formed by first and second diagonally extending walls which have a seat formed at their point of juncture. Each seat is arcuate in configuration and is designed to receive the supporting pin mounted in the aperture of the pole.

The pole will include a plurality of apertures formed therein such that pins may be inserted at various locations. Each pin is designed to support a hub or hub like member. In the case of a hub, the hub is arranged to receive supporting members which are inserted therein. The supporting members will include a vertical segment which fits within the hub and an outwardly extending arm. The outwardly extending arm may in turn support other desired objects. Such objects could include bird feeders, trays and the like.

Each hub may also function to support a container which is integrated with the hub. Such containers could include plant containers, feeders, etc.

The hub may be formed of any suitable material and in a preferred embodiment, is formed of a plastic material. Many such plastic materials are known in the art and can be utilized in the practice of the present invention.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Figure 1:
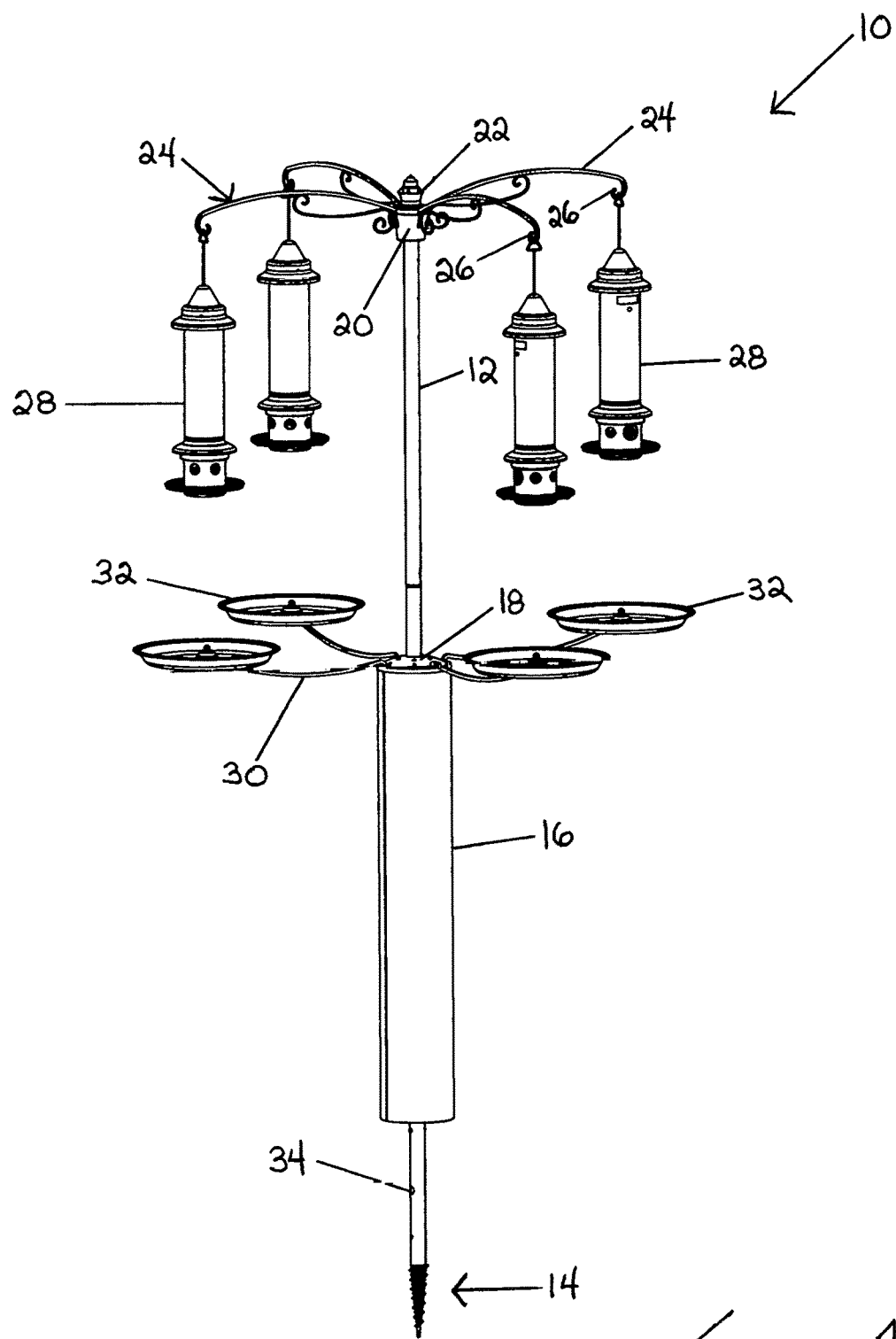
FIG. 1 is perspective view of a first embodiment of the invention.

Referring to the drawings in greater detail and by reference characters thereto, there is illustrated in FIG. 1 a first embodiment of the present invention wherein there is shown a pole system generally designated by reference numeral 10.

Pole system 10 includes a pole 12 which, in some embodiments, may be formed of a plurality of components suitably secured together. As seen, pole 12 includes a screwthreaded end segment 14. Screwthreaded end system 14 is preferably formed to have a double helical screw on the outside thereof. The double helical screw preferably includes a first thread which extends outwardly from the base by a first distance, and a second thread which extends outwardly from the base by a second distance, with the first distance being greater than the second distance.

As may be seen in FIG. 1, the lower portion of pole 12 is surrounded by a baffle 16 in order to deny access to animals attempting to climb the pole system. Both pole 12 and baffle 16 may be formed of any suitable material and in the preferred embodiment, are formed of a metallic material.

In the embodiment illustrated in FIG. 1, pole system 10 includes a lower hub 18 and an upper hub 20 which will be described in greater detail hereinbelow.

The top of the pole is capped with a finial 22.

Upper hub 20 has a plurality of upper supporting members 24 mounted therein as will be discussed in greater detail hereinbelow. Each upper supporting member 24 has a curled end forming a hook 26. Mounted on upper supporting members 24 are bird feeders generally designated by reference numeral 28. Each bird feeder 28 may be any suitable type known in the art.

Lower hub 18 also supports lower supporting members 30 which extend outwardly therefrom. Each lower supporting member 30 has a tray 32 associated therewith. Trays 32 are mounted so as to be below a respective bird feeder 28. When feeding from bird feeders 28, certain birds discard a number of seeds. These stray seeds can kill vegetation located below the bird feeder. In the present case, each tray 32 will catch the excess seed and other birds may eat the same.

Pole 12 includes a plurality of apertures 34 formed therein. Pole apertures 34 are designed to receive a member to allow the support of hubs 18, 20.

Figure 2:
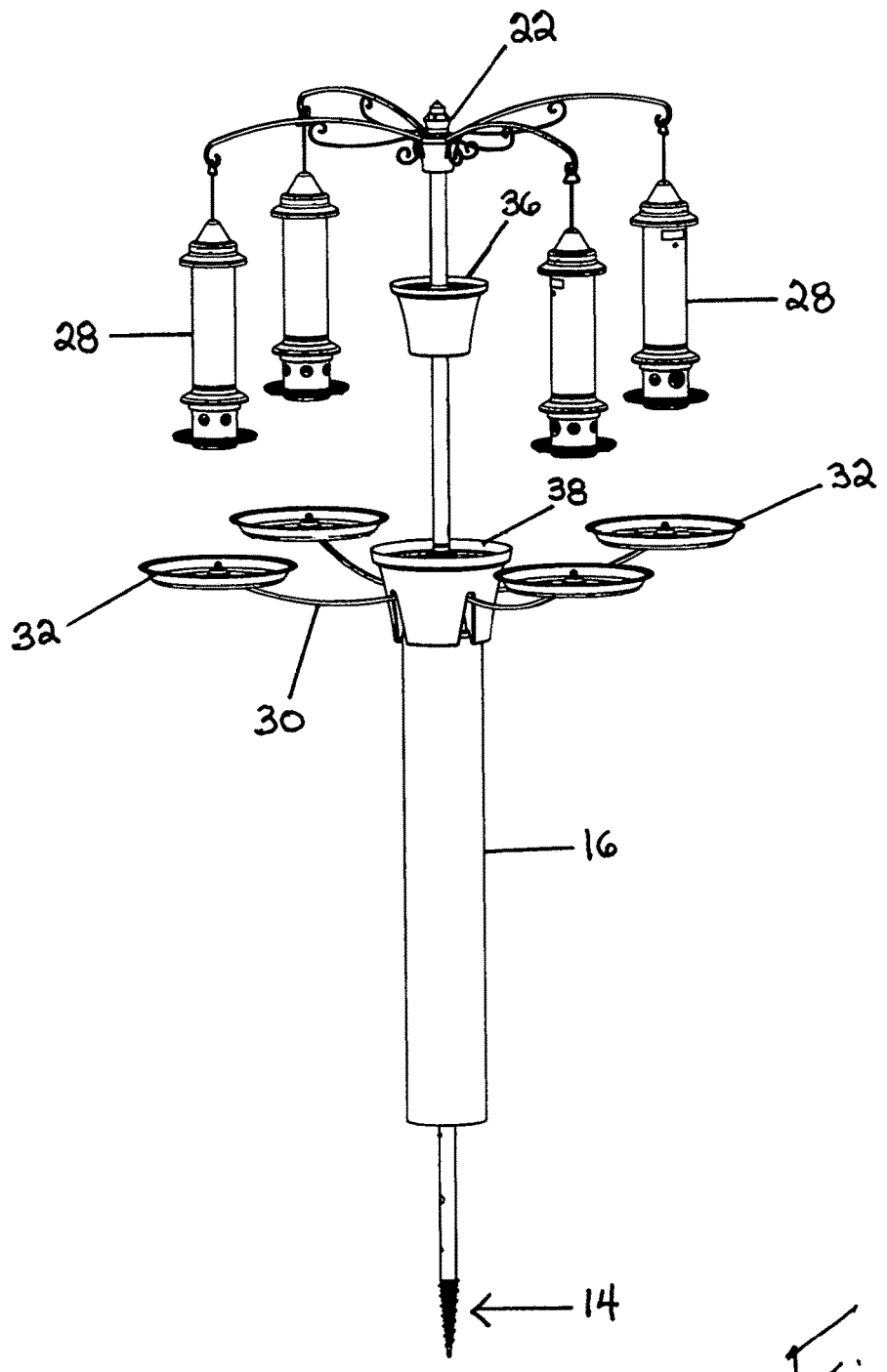
FIG. 2 is a perspective view of a further embodiment of the present invention.

Turning to the embodiment of FIG. 2, there is illustrated a modification of the pole system of FIG. 1. In the arrangement of FIG. 2, there is provided an intermediate hub and container generally designated by reference numeral 36. There is also provided a lower hub and a container generally designated by reference numeral 38.

Figure 3:
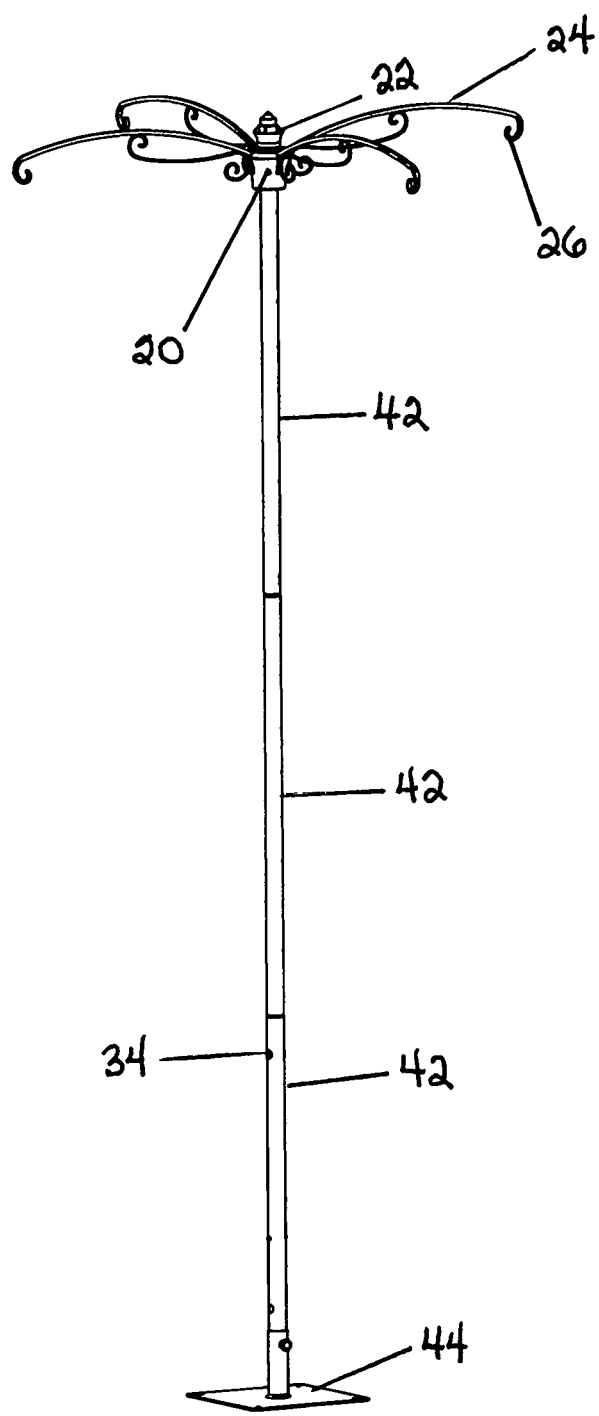
FIG. 3 is a perspective of a still further embodiment of the present invention.
Figure 4:
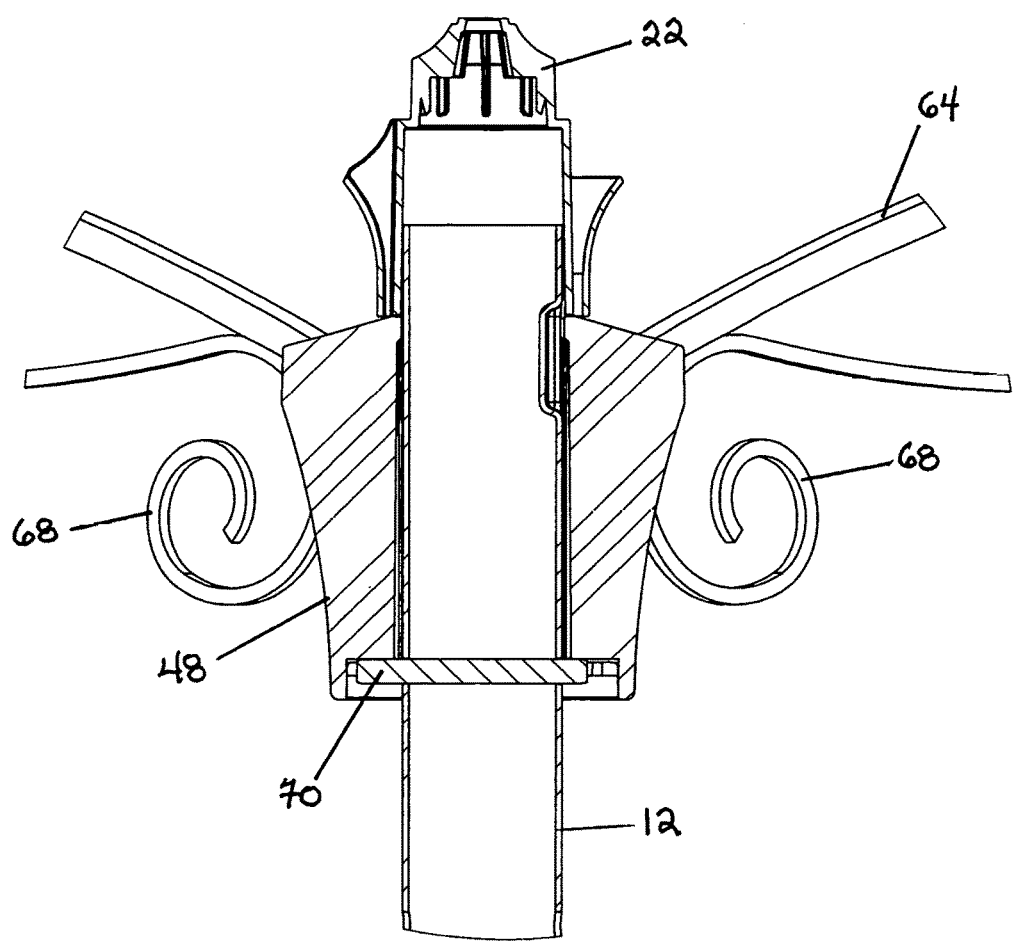
FIG. 4 is a cross-sectional view illustrating the hub member of the present invention.

Turning to FIG. 3, there is illustrated a pole system wherein pole 12 is comprised of a plurality of pole sections 42. In lieu of a threaded end segment, there is provided a base 44 for support of pole sections 42.

FIGS. 4 to 8 illustrate a hub member 20. Hub member 20 is formed to have an outer wall 48 and an inner wall 50. Inner wall 50 has a scalloped bottom wall 52. Scalloped bottom wall 52 comprises a plurality of arcuate recesses 54. Each arcuate recess is defined by a first sloping wall 56 and a second sloping wall 58 which meet at an arcuate seat 60. Extending between outer wall 48 and inner wall 50 are a plurality of transverse walls 62 which define a plurality of inner channels. The inner channels are designed to receive supporting members 24. Each supporting member 24 includes a vertical segment 64 designed to fit within one of the channels. Connecting with vertical segment 64 is an outwardly extending support arm 66 which in turn has a downwardly extending segment 68 which reinforces support arm 66 and also provides an abutting portion against outer wall 48. As may be seen in the drawings, a support pin 70 extends through an aperture 34 in pole 12 and is designed to fit within arcuate recess 54.

The arrangement is such that support pin 70 can ride up one of the sloping walls 56 to seat within an adjacent arcuate recess 54 if sufficient force is applied to hub 20. Such may be the case, for example, when exterior forces such as wind and/or a person knocking one of the arms supplies such a force.

Figure 5:
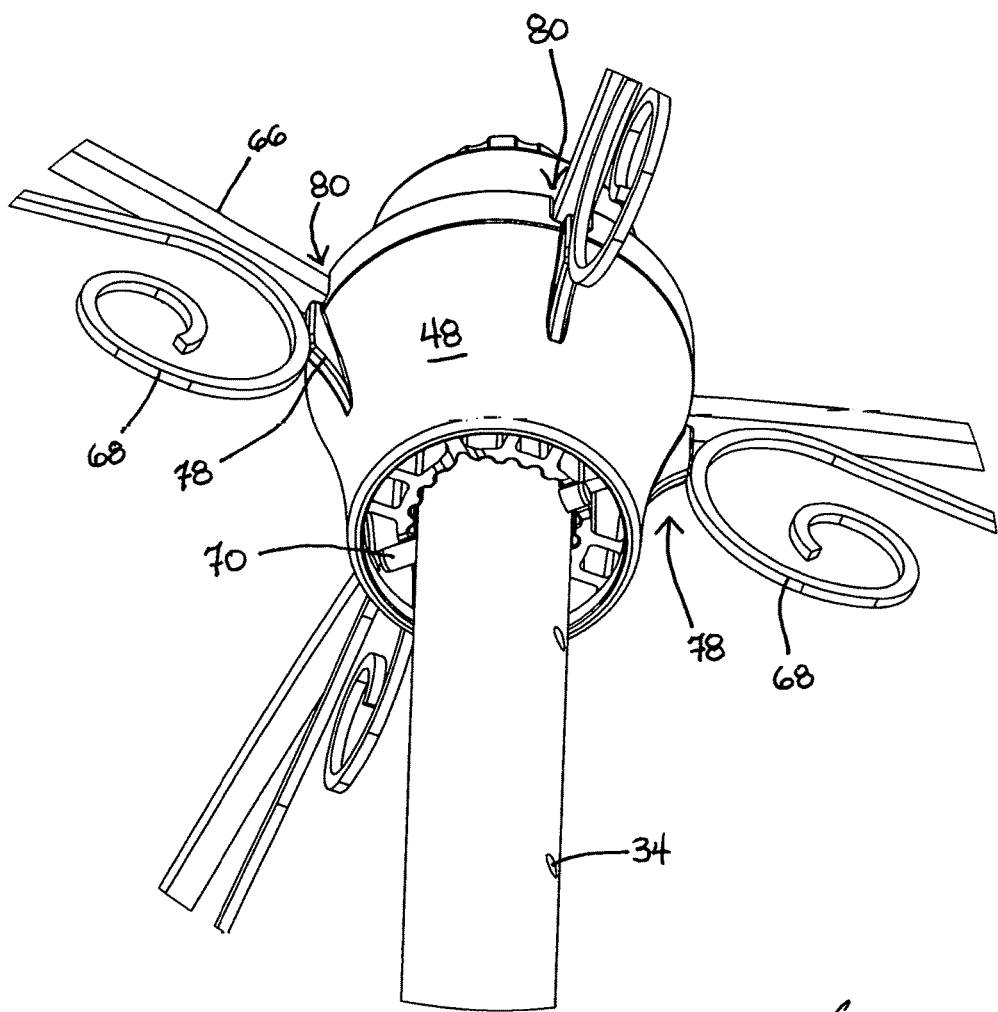
FIG. 5 is a perspective view of the bottom of a hub according to the present invention.
Figure 6:
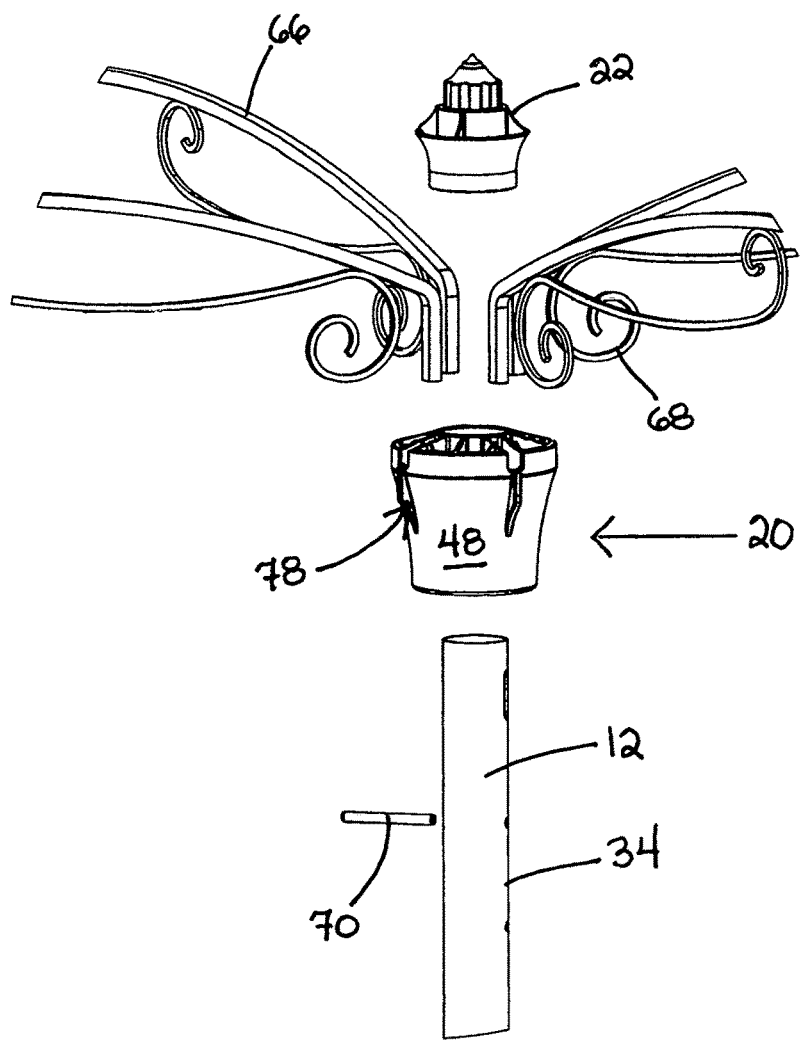
FIG. 6 is an exploded view of an embodiment of the present invention.
Figure 7:
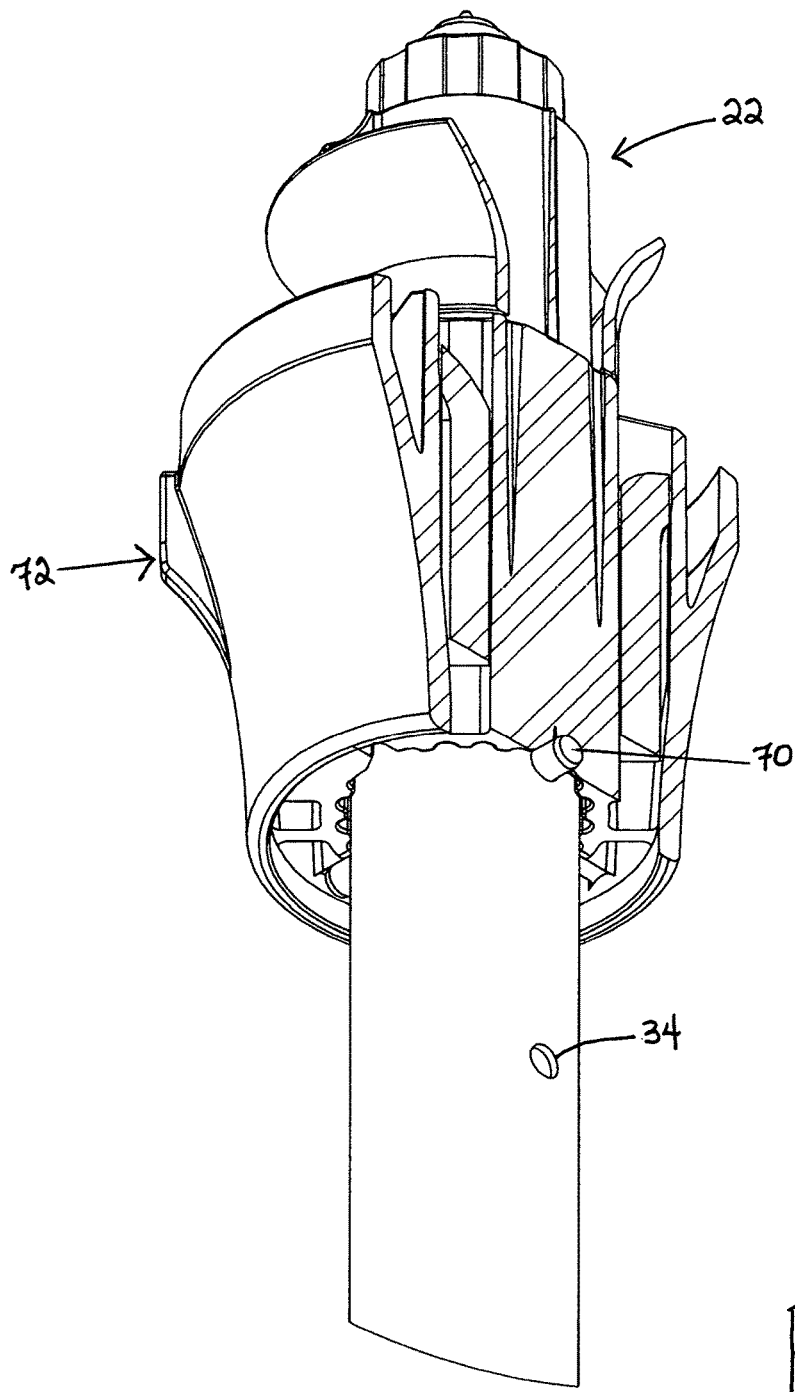
FIG. 7 is a perspective view illustrating the bottom of the inner and outer walls forming a hub member.
Figure 8:
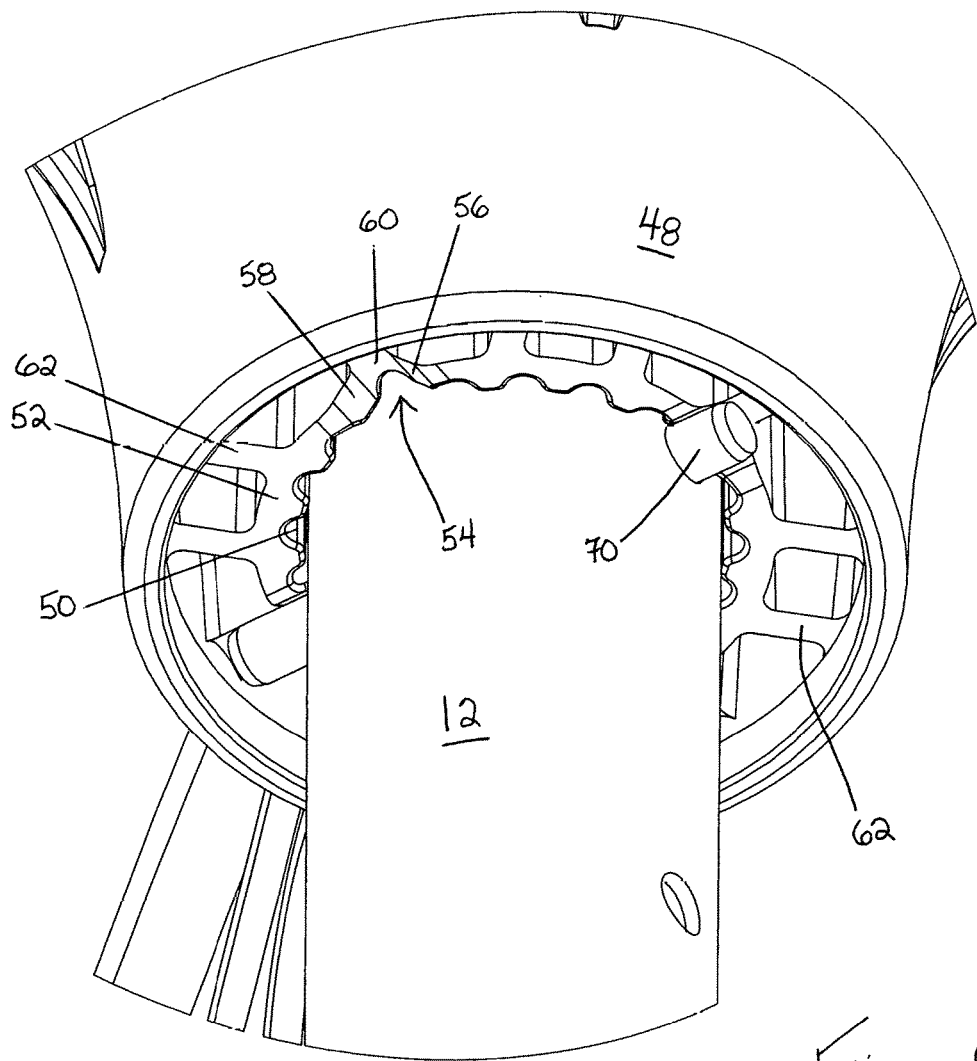
FIG. 8 is a partial perspective view of the hub member.

As seen in FIGS. 5 and 6, a projection 78 is formed on outer wall 48 where downwardly extending segment 68 abuts the outer wall 48. A slot 80 is formed in the upper marginal edge of outer wall 48 to receive support arm 66.

I claim:

1. A pole system comprising:
   a pole having at least one transversely extending aperture formed therein, said aperture extending through said pole;
   a pin mounted in said aperture, said pin extending exteriorly of said pole on opposite sides thereof; and
   a hub member rotatably mounted on the pole, said hub member having a bottom surface, said bottom surface including a scalloped wall, said scalloped wall sitting on said pin such that said hub member is supported, said scalloped wall comprising a plurality of arcuate recesses so as to permit rotation of said hub about said pole when a sufficiently large rotational force is applied to said hub, said hub member further including an outer wall, said scalloped wall being located interiorly of said outer wall, said outer wall extending downwardly about said pin to thereby prevent removal of said pin.

2. The pole system of claim 1 further including a plurality of apertures extending through said pole.

3. The pole system of claim 1 further including a container, said container being supported by said hub member.

4. The pole system of claim 1 wherein said hub member includes a plurality of vertically extending inner channels, a plurality of supporting members each including a vertical segment, each of said vertical segments being designed to fit within a corresponding vertically extending inner channel.

5. The pole system of claim 4 wherein each of said supporting members is arranged to receive a container.

* * * * *

UNITED STATES PATENT AND TRADEMARK OFFICE
CERTIFICATE OF CORRECTION

| | | |
|---|---|---|
| PATENT NO. | : 10,119,652 B2 | Page 1 of 1 |
| APPLICATION NO. | : 15/330905 | |
| DATED | : November 6, 2018 | |
| INVENTOR(S) | : Paul L. Cote | |

It is certified that error appears in the above-identified patent and that said Letters Patent is hereby corrected as shown below:

On the Title Page

Column 1,
(71) Applicant should read: Paul L. Cote
(72) Inventor should read: Paul L. Cote Signed and Sealed this
Fifth Day of March, 2019

Andrei Iancu
*Director of the United States Patent and Trademark Office*